United States Patent [19]

Vesce et al.

[11] Patent Number: 4,649,467
[45] Date of Patent: Mar. 10, 1987

[54] HIGH EFFICIENCY MOSFET SINE WAVE GENERATOR

[75] Inventors: Richard V. Vesce, East Hampton; John R. Torres, Somers, both of Conn.

[73] Assignee: United Technologies Corporation, Hartford, Conn.

[21] Appl. No.: 760,849

[22] Filed: Jul. 31, 1985

[51] Int. Cl.⁴ .......................................... H02M 1/12
[52] U.S. Cl. ................... 363/41; 330/251; 330/207 A
[58] Field of Search ............... 363/41; 330/10, 207 A, 330/251

[56] References Cited

U.S. PATENT DOCUMENTS

| 3,970,916 | 7/1976 | Kienscherf | 363/41 X |
| 4,067,057 | 1/1978 | Taddeo et al. | 363/41 |
| 4,244,015 | 1/1981 | Beebe | 363/41 X |
| 4,463,318 | 7/1984 | Kaplan | 330/251 |
| 4,520,437 | 5/1985 | Boettcher, Jr. et al. | 363/41 |

OTHER PUBLICATIONS

Hexfet Databook (1985), International Rectifier, p. A-19.

Primary Examiner—Patrick R. Salce
Assistant Examiner—Marc S. Hoff
Attorney, Agent, or Firm—Francis J. Maguire, Jr.

[57] ABSTRACT

A high efficiency MOSFET sine wave generator is provided using the class D pulse width modulation principle. A triangle wave at $f_0$ is compared to a variable amplitude sinusoid at about $1/10\ f_0$ to provide a pulse width modulated signal for driving a pair of power MOSFETS connected for switching a B+ and a B− power supply. The power switch output is LC filtered and fedback for regulating the amplitude of the modulating sinusoid.

5 Claims, 5 Drawing Figures

HIGH EFFICIENCY MOSFET SINE WAVE GENERATOR

TECHNICAL FIELD

This invention relates to a high efficiency, high power, sine wave generator utilizing Enhancement Mode MOSFET devices which are pulse width modulated at a carrier frequency several times higher than the fundamental frequency and low pass filtered to obtain a regulated sinusoidal output.

BACKGROUND ART

One of the many functional requirements of power supplies is to generate regulated sinusoidal power for various sensor excitations. In producing the sinusoidal output, maximum efficiency is desirable for minimum heat generation, maximum reliability, and minimum system weight.

Present day sinusoid generator designs utilize complimentary power MOSFET devices in the output stage operating in a symmetrical "Class AB" mode. The theoretical maximum efficiency obtainable in this mode of operation is limited to only 78%. This number may be derived by classical load-line analysis and is based on ideal circuit components having zero source impedance, infinite input impedance and infinite gain. For actual circuits, however, ideal parameters do not exist and the maximum obtainable efficiency is, therefore, less than 78%.

The "Class D" mode of operation, which utilizes the basic principle of pulse width modulation to generate a sine wave by filtering a frequency modulated square wave, allows theoretical efficiencies approaching 100%. However, implementation of this design using bipolar transistors has not generally been successful due to the inherent limitations of transistor switching times and drive requirements.

DISCLOSURE OF THE INVENTION

The object of the present invention is to advance the state of the art technology in the power supply art by providing an 80 to 90% efficiency, high power, high accuracy, and low harmonic distortion power supply for any reactive loading within maximum design ratings.

According to the present invention, a high efficiency, high power, regulated sine wave generator is provided by utilizing a pair of MOSFET devices in a power stage gated according to the basic principles of "Class D" pulse width modulation and where the output sinusoid of the generator is amplitude regulated with a feedback circuit which varies the amplitude of the modulation signal in inverse proportion to variations in the amplitude magnitude of the output sinusoid. The MOSFET devices are configured into a dual power switch which features high switching speeds independent of temperature, using negligble gate drive power dissipation, and low source-to-drain "on" resistance, resulting in minimum power dissipation during conduction. Several control circuits are integrated with the MOSFET dual power switch to generate a frequency modulated square wave which is filtered into a sine wave. High efficiency is obtained because, in generating the modulated square wave, the MOSFET devices are operated in a digital mode and are either "on," dissipating relatively low power, or "off," dissipating zero power.

The high efficiency MOSFET sine wave generator, according to the present invention, provides high efficiency (between 80 and 90%), high output power capability (10 to 100 VA range), high accuracy (1% regulation), and low harmonic distortion (less than 5%) for any reactive loading within maximum design ratings.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
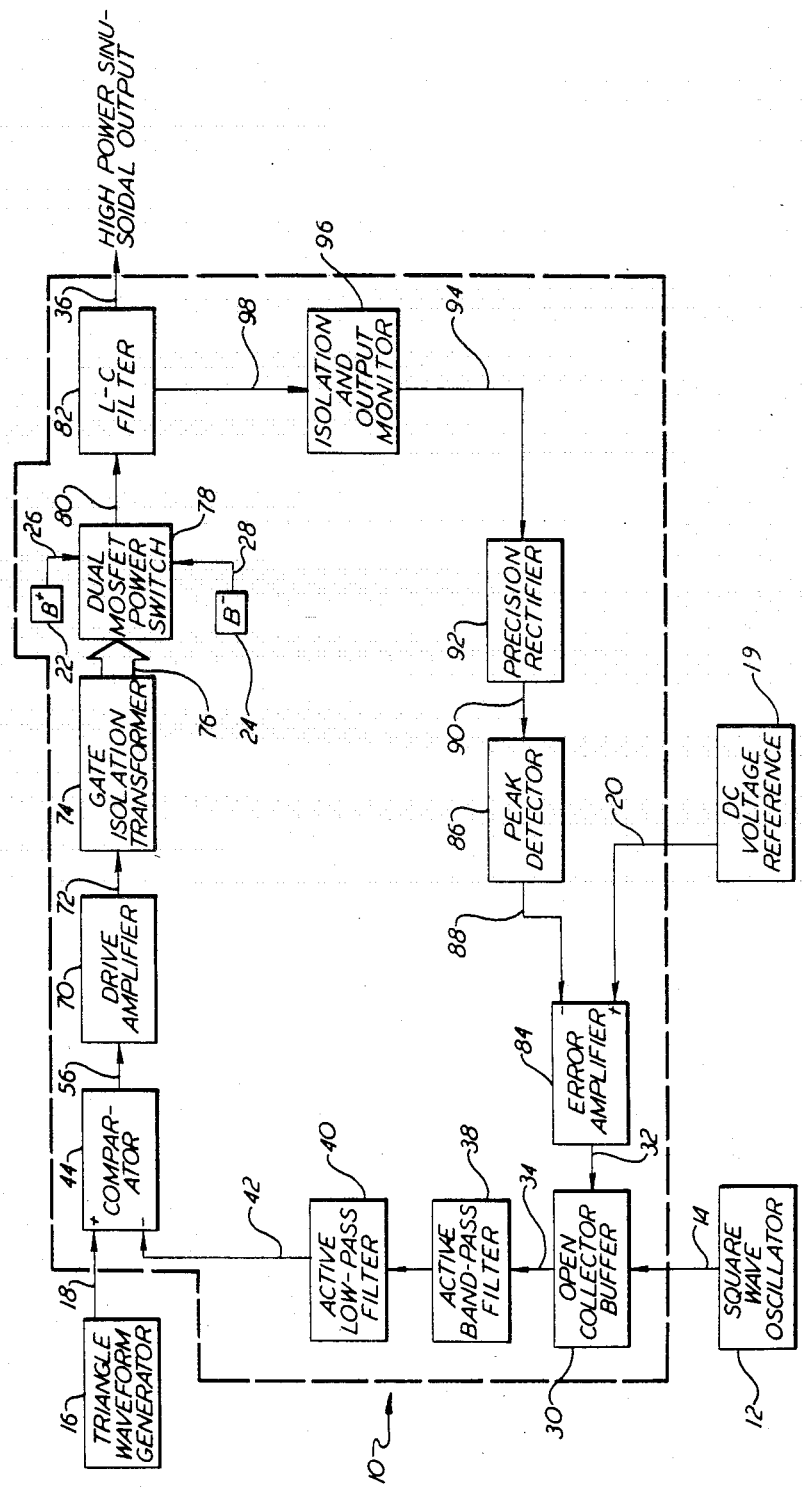
FIG. 1 is a simplified schematic block diagram of a high efficiency MOSFET sine wave generator, according to the present invention.

FIG. 1 is a simplified block diagram illustration of a high efficiency MOSFET sine wave generator 10, according to the present invention. The sine wave generator 10 is responsive to an external square wave oscillator 12 which provides a bipolar square wave signal on a line 14 to the generator 10. A triangle waveform generator 16, also external to the generator 10, provides a constant amplitude triangle waveform on a line 18 having a frequency greater than that of the frequency of the square wave on the line 14. Normally, the frequency of the triangle waveform would be approximately 10 times higher than that of the square wave, although other frequency relationships are certainly contemplated within the scope of the invention. A DC voltage reference 19 provides a DC reference voltage on a line 20. Each of the voltage sources shown external to the high power sinusoidal generator 10, i.e., the square wave oscillator 12, the triangle waveform generator 16, and the DC voltage reference 19 may of course be incorporated within the generator 10. Similarly, a B+ source 22 and a B— source 24, shown internal to the generator 10 may be excluded from the generator 10 so that a B+ voltage on a line 26 and a B— voltage on a line 28 are provided at input ports (not shown) of the generator 10.

An open collector buffer 30 is responsive to the square wave oscillator output signal on the line 14 and to an error signal on a line 32 and acts to vary the amplitude of a square wave output signal on a line 34 according to variations in the error signal on the line 32. As will be explained in more detail below, the changing amplitude of the square wave on the line 34 varies inversely as amplitude changes detected on a line 36 in the output of the generator 10. An active band-pass filter 38 and an active low-pass filter 40 together filter the square wave signal on the line 34 to provide a sine wave signal on a line 42 also having an amplitude inversely proportional to the output signal on the line 36.

Thus, a comparator 44 continually compares the present magnitude of the constant amplitude triangle wave signal on the line 18 to the varying amplitude sine wave signal on the line 42. Since the frequency of the triangle signal on the line 18 is normally about 10 times greater than the frequency of the amplitude varying sinusoid on the line 42, comparator 44 provides a pulse width modulated pulse train with a carrier frequency equal to that of the triangle waveform and a pulse width modulation frequency equal to that of the sine wave.

Figure 2:
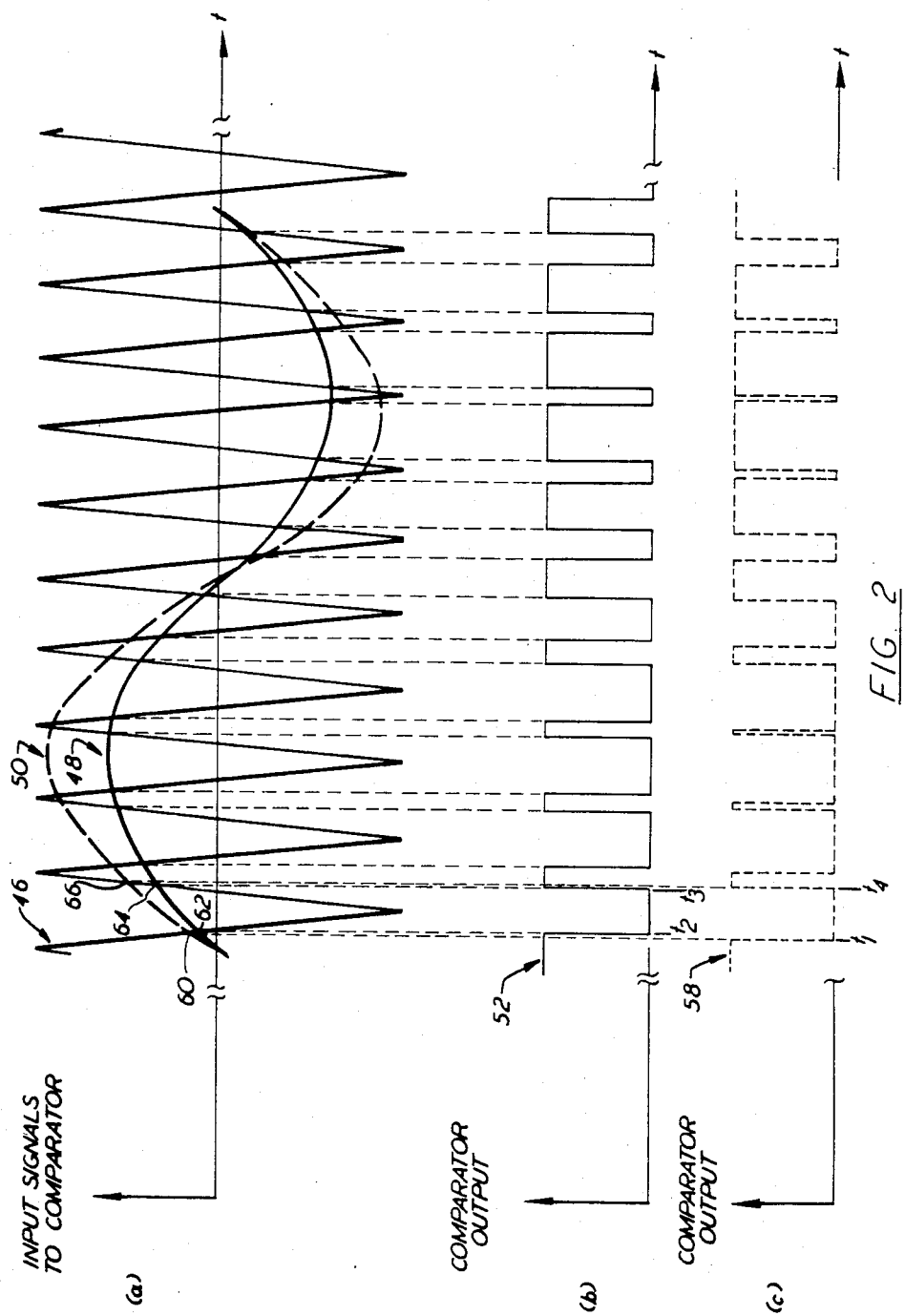
FIG. 2(a) is an illustration of the input waveforms provided to the comparator of FIG. 1.
FIG. 2(b) is an illustration of an output waveform from the comparator of FIG. 1 in response to an input sinusoid of relatively low amplitude.
FIG. 2(c) is an illustration of a waveform at the output of the comparator of FIG. 1 obtained in response to a sinusoid input to the comparator of FIG. 1 of relatively high magnitude.

The modulation effect is generally shown in FIG. 2. FIG. 2(a) shows typical waveforms at the inputs to the comparator 44 of FIG. 1. Waveform 46 illustrates the triangular signal on the line 18 of FIG. 1. It is a triangle waveform with fixed amplitude and fixed frequency approximately 10 times higher than the frequency of the variable amplitude modulating sine wave. Two typical sine waveforms 48, 50 are illustrated in FIG. 2(a) and correspond to the signal on the line 42 of FIG. 1. It will be observed that, for the general case, the amplitude of the sine wave will be less than or equal to the amplitude of the triangle wave.

FIG. 2(b) is an illustration of a waveform 52 corresponding to an output signal on a line 56 from the comparator 44 in response to the triangle waveform 46 of FIG. 2(a) being modulated by the sinusoidal waveform 48. Similarily, FIG. 2(c) is an illustration of a waveform 58 corresponding to the output signal waveform which appears on the line 56 in the presence of the sinusoidal modulating waveform 50 of FIG. 2(a). (The modulating waveform 50 of FIG. 2(a) and the corresponding output signal waveform 58 of FIG. 2(c) are shown in dotted lines in order to facilitate an understanding of the manner in which the comparator output signal variation from minimum to maximum pulse width is directly proportional to the amplitude of the sine wave input voltage).

Thus, it will be observed in FIG. 2(a) at a point 60 that the amplitude of the triangle wave signal 46, which prior to time $t=t_1$ was greater than the magnitude of the modulating waveform 50, crosses over and then becomes lesser in magnitude than waveform 50. This is evidenced in FIG. 2(c) by a change in the output waveform 58, corresponding to the signal on the line 56 of FIG. 1 from a high output state to a low output state. This is due to the fact that the triangle waveform is presented to the noninverting input of the comparator 44 while the modulating waveform is presented to the inverting input. Of course, if the reverse were true, the resulting waveforms would merely be mirror images of those presented in FIGS. 2(b) and (c). If, instead of modulating waveform 50 of FIG. 2(a) being present on the line 42 of FIG. 1, waveform 48 were present instead, than the switch from a high state to a low state would take place at a slightly later point in time $t_2$ as indicated by waveform 52 in FIG. 2(b). This result occurs because a crossover 62 as shown in FIG. 2(a) occurs at a slightly later point in time for a case where the triangle waveform 46 is modulated by a sinusoid 48 having an amplitude less than that of waveform 50. The opposite effect occurs on increasing values of the triangle waveform 46. Thus, at point 64 in FIG. 2(a) the triangle waveform amplitude would crossover the smaller amplitude waveform 48 at time $t=t_3$ before crossing over the higher amplitude waveform 50 at point 66 at time $t=t_4$.

Using the same reasoning as employed above to describe the waveforms of FIG. 2, it will be observed for all later times in FIG. 2 that the variation from minimum to maximum pulse width is greater for the high amplitude modulating signal. This effect may be likened to an accordion where FIG. 2(b) corresponds to an accordion being pulled apart and compressed moderately while FIG. 2(c) corresponds to an accordion being stretched and compressed with great force in both directions. Thus, it will now more easily be seen that the pulse width variation in the modulated pulse train is directly proportional to the amplitude of the sine wave input voltage. Of course, it will be understood that the comparator 44 of FIG. 1 could as easily be responsive at its noninverting input to the sinusoidal modulating waveform and the triangle waveform at its inverting input. The result would be similar except reversed from that described above.

Figure 3:
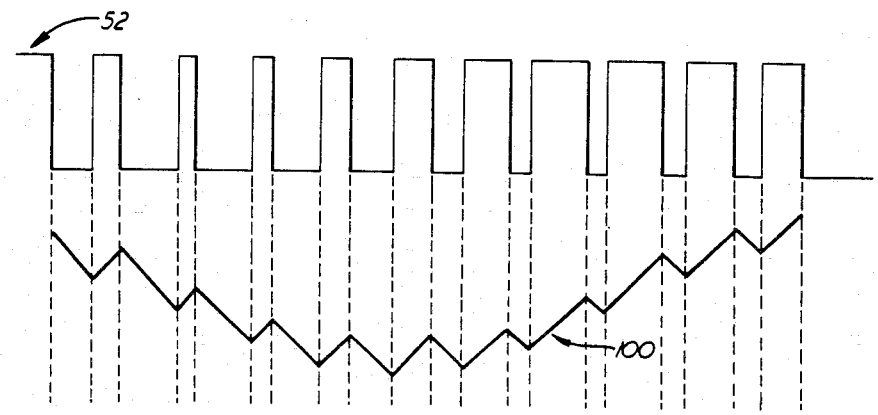
FIG. 3 is an illustration of a portion of the output waveform of the generator which would result from a modulating waveform similar to that of FIG. 2(b)
Figure 4:
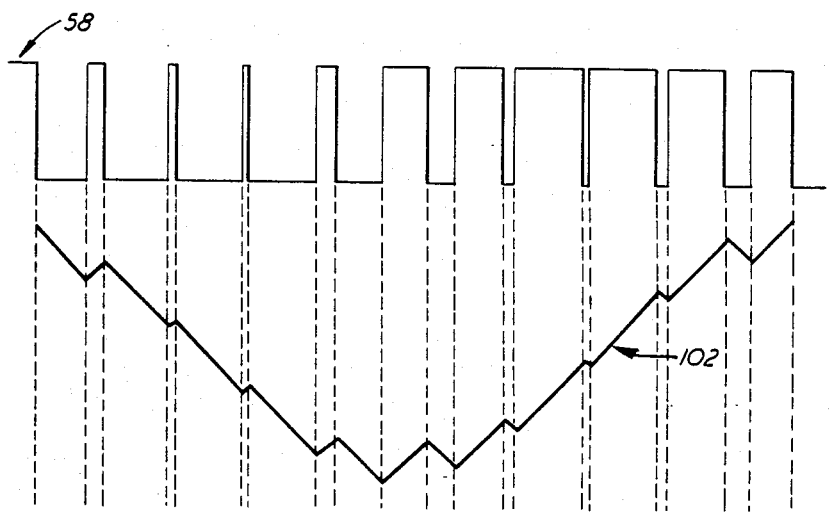
FIG. 4 is an illustration of a portion of the output waveform of the generator which would result from a modulating waveform similar to that of FIG. 2(c)

FIGS. 3 and 4 illustrate the relative magnitudes of the sinusoidal output signal on the line 36 shown as waveforms 100, 102 of FIGS. 3 and 4, respectively, and which correspond to the modulated pulse trains 52, 58 of FIGS. 2(b) and (c), respectively. It will be observed that the modulated pulse train 58 with the greatest variation has a correspondingly high amplitude output signal waveform 102. Similarily, the waveform 52 with the lesser pulse width variations has a relatively smaller magnitude output sine waveform 100. These waveforms are theoretical representations assuming the LC filter output is directly proportional to L di/dt.

The modulated pulse train on the line 56 in FIG. 1 is power amplified in a drive amplifier 70 and fed on a line 72 to the primary of an isolation transformer 74 to drive, by means of gate signals on lines 76, a dual MOSFET power switch 78. Isolation is required because of the use of a B+ and a B− supply. The isolation transformer is driven by amplifier 70 in order to increase the drive power capability of comparator 44. This permits faster switching times in the power MOSFETS by providing additional current to quickly charge and discharge the gate to source capacitances. The power switch 78 is responsive to a B+ and B− supply 22, 24, and provides a modulated pulse train output on a line 80 similar to the pulse train on the line 56 except at a higher power level.

The modulated output of the MOSFET power switch 78 is filtered by a low-pass LC filter 82 into the high power sinusoidal output signal on the line 36. The amplitude of the output signal on the line 36 is directly proportional to the variation from minimum to maximum pulse width which occurs in the modulated pulse train signal on the line 56. The power capability for the output signal of this circuit for the output signal of this circuit is on the order of the 10 to 100 VA range. It is efficient to between 80 and 90%. It has low harmonic distortion (less than 5%) for any reactive loading within design ratings.

The amplitude of the output sine waveform on the line 36 may be regulated (to about 1% accuracy) by providing a feedback loop into the inverting input of an error amplifier 84 which monitors the peak value of the output voltage by means of a peak detector 86 which provides a DC signal on a line 88 having a magnitude directly proportional to the peak amplitude of a full-wave rectified signal on a line 90 from a precision rectifier 92. The precision rectifier 92 receives its input on a line 94 from an isolation transformer and output monitor 96 which in turn receives its input on a line 98 from the LC filter. Since the open collector buffer 30 allows the amplitude of the square wave to be controlled between zero and a selected level, according to the magnitude of the error voltage on the line 32, the value of the reference voltage on the noninverting input of the error amplifier therefore determines the amplitude of the output sine wave voltage on the line 36 because the error amplifier will correct its output to maintain equal voltages on its inverting and noninverting inputs.

Figures 5, 5A:
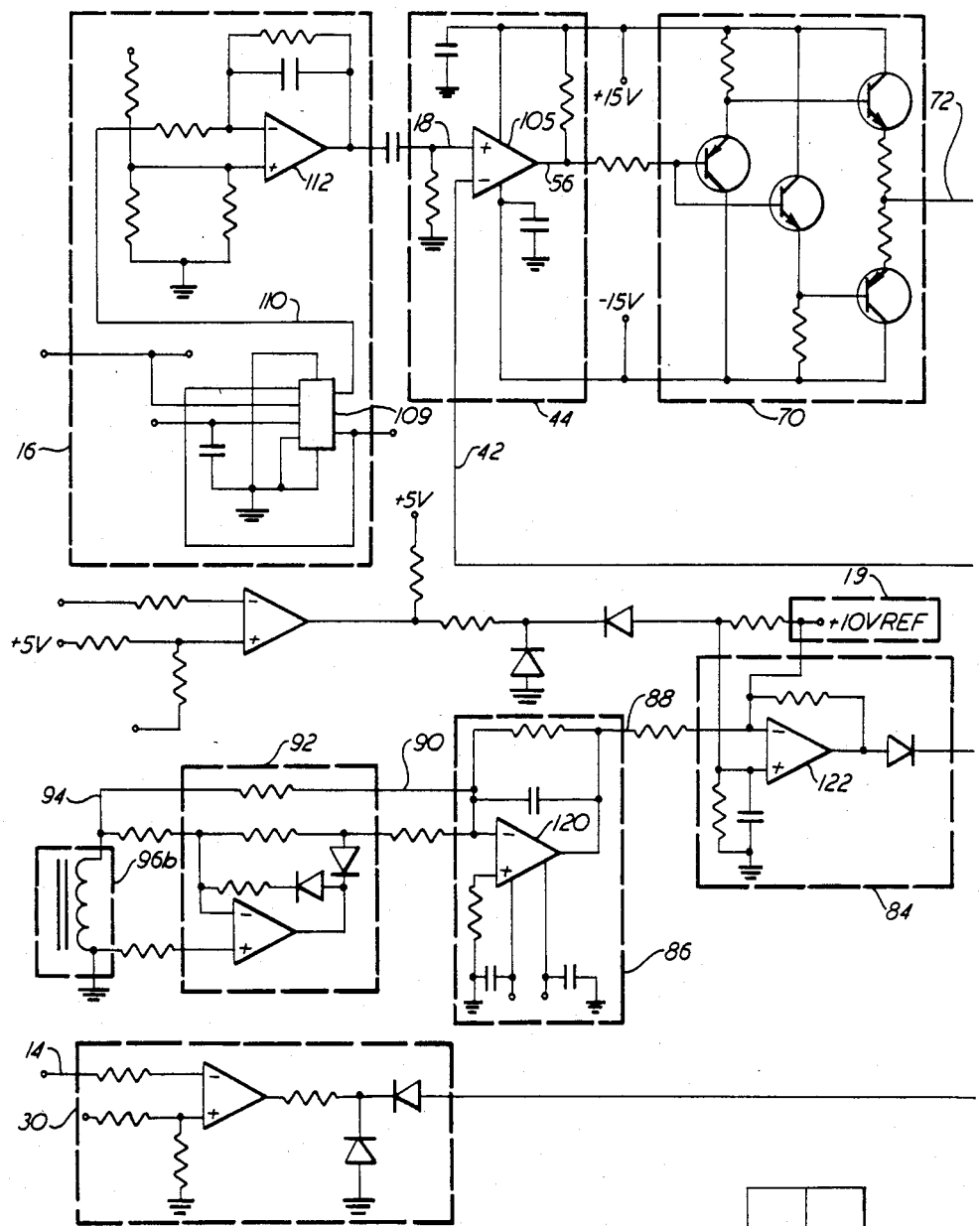
FIG. 5 is a detailed schematic diagram of a high efficiency MOSFET sine wave generator, according to the present invention.
Figure 5B:
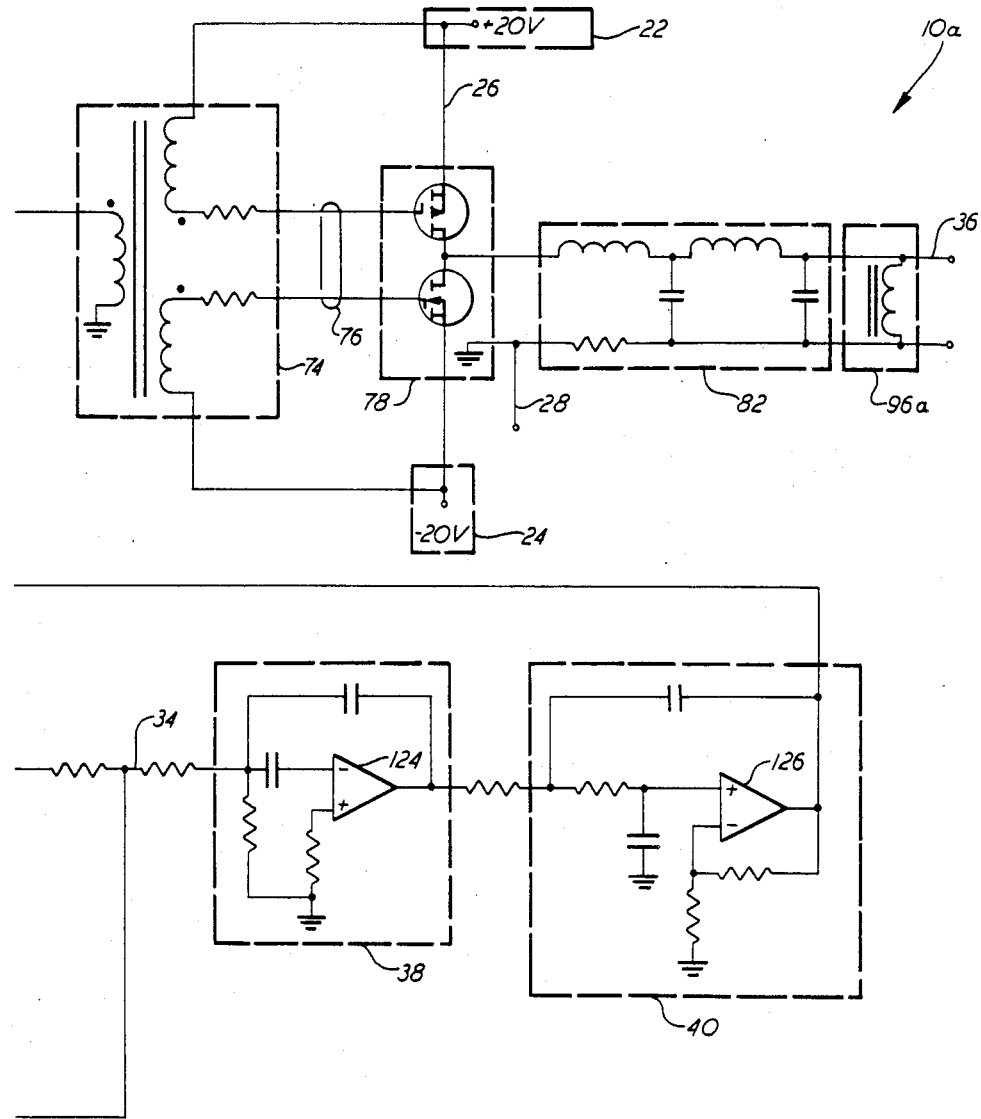

FIG. 5 is a detailed schematic block diagram of a high efficiency MOSFET sine wave generator 10a, according to the present invention. Unlike FIG. 1, the circuit of FIG. 5 includes a triangle waveform generator 16 and a DC voltage reference 19 within the circuit 10 while at the same time being similar to FIG. 1, in excluding the square wave oscillator 12 from the circuit. Thus, in FIG. 5, a square wave input signal on a line 14 is received from some unspecified square wave oscillator external to the circuit 10a illustrated.

The triangle waveform generator 16 consists of a square wave generator which may comprise a CD 4013 D Flip-Flop 109 which provides a square wave on a line 110 to an opamp 112 hooked-up as an integrator. The resulting triangle waveform on the line 18 is AC coupled to the comparator circuit 44 which includes a comparator 105 such as a low power, low offset voltage device, e.g., an LM139 comparator. The modulated pulse train on the line 56 is provided to the drive amplifier 70 which is made up of several bipolar transistors hooked-up as shown to provide a fast switching signal on a line 72 alternating between off and on. The transformer 74 primary couples this signal to a pair of secondaries which provide isolated gate signals to the MOSFET switch 78. These may be complimentary switches as shown in FIG. 5, i.e., one N-channel and one P-channel, or may be both N-channel or both P-channel. In any event, they are connected to respective equal magnitude plus and minus DC power supplies. The resulting high power modulated pulse width signal is provided to the LC filter 82 which provides a sine wave output signal on the line 36.

A transformer primary 96a couples the output signal on the line 36 to a secondary 96b which provides the output monitor signal on the line 94 to the precision rectifier 92. A full wave rectified output signal on the line 90 is provided to the peak detector 86 which may include an opamp 120. The peak detector provides an output signal on the line 88 having a magnitude proportional to the peak amplitude of the rectified signal on the line 90.

The output of the peak detector is applied to the inverting input of an error amplifier 84 which includes an opamp 122. The output of the error amplifier 84 is chopped to ground periodically by the open collector buffer 30. Assuming a 50% duty cycle on the square wave input on the line 14, a 50% duty cycle will also appear on the signal on the line 34. Additional opamps 124, 126 may be hooked-up as band-pass 38 and low-pass 40 filters which provide the variable amplitude modulating sinusoid signal on the line 42 to the comparator 44.

Although the invention has been shown and described with respect to exemplary embodiments thereof, it should be understood by skilled in the art that the foregoing and various other changes, omissions and additions may be made therein and thereto, without departing from the spirit and the scope of the invention.

We claim:

1. Apparatus, responsive to a variable amplitude sinusoidal source which provides a sinusoidal modulating signal at a first frequency, the source being responsive to an error signal from said apparatus for varying the amplitude of the modulating signal in response to the error signal, and said apparatus responsive to a fixed amplitude triangle wave voltage source, which provides a bipolar triangle signal at a second frequency greater than the first frequency and at an amplitude greater than or equal to the amplitude of the modulating signal, said apparatus comprising:

comparator means, responsive at separate inputs thereof to the modulating signal and to the triangle signal for providing a low power modulated pulse train signal;

drive amplifier means, responsive to said modulated pulse train signal for providing an amplified modulated pulse train signal;

isolation transformer means, having a primary and two secondary windings, responsive at the primary thereof to said amplified modulated pulse train signal, for providing alternating isolated gate drive signals at the secondary windings;

a pair of complementary MOSFET power switches, each responsive at a gate input thereof to one but not the other of the alternating gate drive signals, one switch responsive to a positive DC source having a voltage magnitude equal but opposite in sign to a negative DC source connected to the other switch, for providing a modulated pulse train power output signal;

LC filter means, responsive to said modulated pulse train power output signal for providing a sinusoidal power output signal; and error circuit means, responsive to said sinusoidal power output signal for comparing the magnitude thereof to a reference signal magnitude and for providing an error signal to the variable amplitude sinusoidal source for varying the amplitude of the modulating signal in inverse proportion to said sinusoidal power output signal so as to cause the voltage magnitude of said sinusoidal power output signal to vary in such a way as to tend to reduce the magnitude of the error signal to zero.

2. The apparatus of claim 1, wherein said error circuit means further comprises:

precision rectifier means, responsive to said sinusoidal power output signal for providing a rectified signal;

peak detector means, responsive to said rectified signal for providing a DC voltage signal having a magnitude directly proportional to the peak amplitude of said rectified signal; and error amplifier means, responsive to said DC voltage signal from said peak detector and to the reference signal for providing said error signal having a magnitude directly proportional to the difference between the magnitudes of said signal and said reference signal.

3. The apparatus of claim 1, wherein said error circuit further comprises:

a square wave oscillator for providing a first square wave signal output of constant amplitude;

open collector buffer means, responsive to said error signal and to said square wave signal output for providing a second square wave output having an amplitude which varies inversely with respect to variations in the magnitude of said sinusoidal power output signal; and filter means, responsive to said second square wave output signal for providing said sinusoidal modulating signal.

4. Apparatus, responsive to a squarewave oscillator which provides a fixed amplitude squarewave signal at a first frequency and responsive to a fixed amplitude triangle signal from a triangle wave voltage source, said apparatus comprising:

an open collector buffer amplifier, responsive to an error signal and to the squarewave signal for providing an amplified squarewave output signal having an amplitude which varies inversely with respect to variations in the magnitude of a signal indicative of the magnitude of a sinusoidal power output signal from said apparatus;

filter means, responsive to said amplified squarewave output signal for providing a sinusoidal modulating signal;

comparator means, responsive at separate inputs thereof to said sinusoidal modulating signal and to the triangle signal for providing a low power pulse width modulated signal;

drive amplifier means, responsive to said pulse width modulated signal for providing an amplified pulse width modulated signal;

isolation transformer means, having a primary and two secondary windings, responsive at the primary thereof to said amplified pulse width modulated signal, for providing alternating isolated gate drive signals at the secondary windings;

a pair of MOSFET power switches, each responsive at a gate input thereof to one but not the other of the alternating gate drive signals, one switch responsive to a positive DC source having a voltage magnitude equal but opposite in sign to a negative DC source connected to the other switch, for providing a pulse width modulated power output signal;

LC filter means, responsive to said pulse width modulated power output signal for providing said sinusoidal power output signal; and error circuit means, responsive to said sinusoidal power output signal for comparing the magnitude thereof to a reference signal magnitude and for providing said error signal to said open collector buffer amplifier for varying the amplitude of the squarewave signal in inverse proportion to said sinusoidal power output signal so as to cause the voltage magnitude of said sinusoidal power output signal to vary in such a way as to tend to reduce the magnitude of the error signal to zero.

5. The apparatus of claim 4, wherein said error circuit means comprises:

peak detector means, responsive to said sinusoidal power output signal for providing a sensed signal having a magnitude directly proportional to the peak amplitude of said sinusoidal power output signal; and error amplifier means, responsive to said DC voltage signal from said peak detector and to the reference signal for providing said error signal having a magnitude directly proportional to the difference between the magnitudes of said sensed signal and said reference signal.

* * * * *